Oct. 10, 1961  H. D. EPSTEIN  3,004,203
OVERLOAD PROTECTIVE APPARATUS
Filed March 16, 1959

Henry David Epstein,
Inventor.
Koenig and Pope,
Attorneys.

3,004,203
OVERLOAD PROTECTIVE APPARATUS
Henry David Epstein, Cambridge, Mass., assignor to Texas Instruments Incorporated, Dallas, Tex., a corporation of Delaware
Filed Mar. 16, 1959, Ser. No. 799,621
8 Claims. (Cl. 318—221)

This invention relates to overload protective apparatus, and more particularly to overload protectors for electric motors.

Among the several objects of this invention may be noted the provision of overload protective apparatus which will effectively protect electric motors against all types of overload conditions, including both locked rotor and running overload types; the provision of such apparatus which is reliable in operation and has a minimum of components and complexity; the provision of apparatus of the class described in which the thermostatic element thereof has a prolonged "off" time; and the provision of overload protective apparatus having heating and cooling characteristics which substantially match those of the electric motor which it protects. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

Corresponding reference characters indicate corresponding parts throughout the several views of the drawings.

In the design and construction of overload protective apparatus for electric motors, particularly of the split-phase type, it is difficult to match the heating and cooling characteristics of the relatively small overload protective apparatus to that of the bulky motor. It is especially difficult to construct such protective apparatus which will be actuated practically instanteously to open the motor circuit in response to motor faults (e.g., a locked rotor condition) which cause rapid rises of motor winding temperatures, and still have a sufficient cooling or "off" time to avoid reclosing the circuit before the temperature of the windings falls to approximately the same temperature as that of the protective apparatus. For example, if the protective apparatus has a temperature-time cooling characteristic that decreases more rapidly than that of the windings themselves, the temperature of the windings will be higher than that of the protective apparatus at the time the latter recloses. If the motor fault continues, the automatic opening and reclosing of the apparatus effects thermal intergration of the motor winding temperature, i.e., the temperature of the motor windings will be incrementally increased during each cycle of protector operation and eventually exceed a safe level, even though the overload protective apparatus continues to function at its predetermined operating or opening temperature and its predetermined reclosing and reset temperature. In accordance with the present invention, overload protective apparatus is provided which has temperature-time characteristics which substantially match those of the motor with which it is associated. By certain novel features of the construction, the cooling rate of my protective apparatus is decreased so that under locked rotor conditions, for example, thermal integration of the motor winding temperature is avoided.

Figure 1:
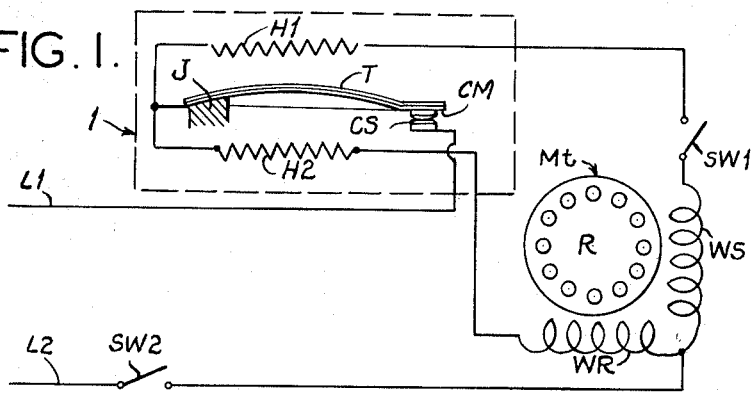
FIG. 1 is a schematic circuit diagram of one embodiment of the overload protective apparatus of the present invention electrically interconnected with an electric motor.

Referring now to FIG. 1, and A.C. motor of the split-phase type is generally indicated at reference character M*t*, and includes a conventional auxiliary or start winding WS and a main or run winding WR associated with a rotor R. A switch SW1, such as the customary centrifugal type switch which will open only after the motor comes up to running speeds, is connected in series with winding WS (via SW1) and WR are electrically commonly connected through a line switch SW2 to a terminal L2 of an A.C. power source. The other side of the start winding WS (via SM1) and WR are electrically connected to an electrical junction J. An electrical heater unit H1, positioned in heat-exchange or transfer relationship with a thermostatic element T, is interconnected serially with WS between junction J and the A.C. power source. A second electrical heater H2 may be optionally connected as shown in series with run winding WR and the power source. The electrical circuit to the other side of the A.C. power source (line terminal L1) is completed through a movable contact CM and a registering contact CS. The components included in the box in FIG. 1, and generally indicated at reference numeral 1, constitute an overload protective apparatus.

Thermostatic element T may be any element of bonded-together high-and-low thermal expansion layers, which is electrically conductive. Preferably it is a bimetallic snap-acting disc having a layer of high expansion metal or metallic alloy bonded to another layer of dissimilar metal having a lower coefficient of thermal expansion. Such thermostatic discs, having a predetermined operating temperature which when exceeded will cause a sudden reversal of curvature of the disc from the position shown in FIG. 1 to actuate contact CM and separate it from CS, are well known to those skilled in the art. An exemplary thermostatic element of this type incorporated in a thermostatic switch is described in detail in U.S. Patent 2,199,383. This type of thermostatic element is of the automatic reset type and will, upon its temperature decreasing below a predetermined temperature, reclose contact CM against contact CS. As thermostatic element T constitutes a common current path for both the run and start windings, the electrical resistance (as measured from J to CM) across the disc T should be very low to avoid a self-heating effect and the resulting heat variation from the additive currents.

Thermostatic element T has a permanent heat-conductive connection to J which may be formed by welding or riveting, so that heat will be transferred to it from H1, for example, by convection and radiation (because of their physical proximity), and also conductively through the electrical and thermal conductor interconnecting H1 and junction J. Inasmuch as this connection between J and thermostatic element T is permanent, heat will continue to be conducted to the latter during periods when contact CM is separated or spaced from contact CS. Thus, the cooling rate of thermostatic disc T is decreased by this construction and will delay the reclosing of contacts CM and CS so that the characteristic time-temperature curve of T will be made to closely match that of motor M*t*, which of course has a much greater physical mass and, nominally, a poor coefficient of heat transfer.

There is also a conductive transfer of heat via junction

J to element T from the run winding heater unit H2, which also contributes to the delayed cooling rate of disc T when open. However, as noted above, run winding heater H2 is optional.

Heater H2, if utilized, need not be in as good a heat-exchange relationship to element T as is H1. During running overloads, such as an ultimate trip condition (i.e., where an essentially constant motor load is of such a level that it would eventually cause the motor winding temperature to rise above a predetermined safe level), which cause a more gradual rate of temperature rise, heat is transferred from the winding to the thermostatic element T sufficiently rapidly so there is little temperature differential between T and the windings of motor Mt. It will be noted that during such running overloads, switches SW1 and H1 are not energized. If the overload protective apparatus is not in heat-transfer relationship with the motor Mt (mounted on the housing or associated with the motor windings), then heater H2 would provide the sole sensing means (except for any self-heating effect caused by the run winding current being carried by element T) for such running overloads. On the other hand, if protective apparatus 1 is mounted in the motor windings, heater H2 may be simply a metallic terminal, such as monel.

It can be seen, therefore, that this apparatus of FIG. 1 operates to protect the motor against overloads of all types, and that if the overload fault is not rectified element T will continue to cycle between open and closed positions, intermittently deenergizing and reenergizing motor Mt, but because of the decreased cooling rate of T excessive motor winding temperatures will be avoided.

Figure 2:
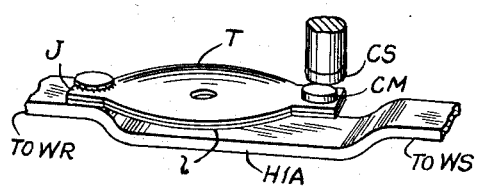
FIGS. 2 and 3 are perspective views of two additional embodiments of the present invention.
Figure 3:
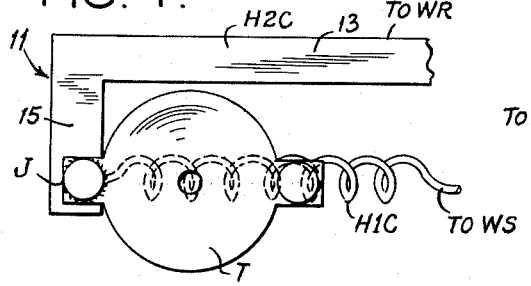

More detailed physical embodiments of the present invention are illustrated in FIGS. 2 and 3. In the former embodiment, disc T is positioned in close proximity to a strip H1A with its low expansion layer $l$ substantially parallel to one surface of HA. This strip H1A is formed of electrically resistant thermally conductive metal or metallic alloy and conducts the current to start winding WS. It therefore heats element T in response to current drawn by winding WS. Element T is in a thermally conductive relationship to H1A at all times because of the permanent heat-conductive connection at junction J. The connection of this overload protective apparatus to run winding WR is made as indicated. Stationary contact CS may be physically affixed to any support so that it will be held in a fixed registering position relative to contact CM.

The FIG. 3 embodiment employs a U-shaped strip of thermally conductive electrically resistant material, as indicated at 3, to heat element T in response to the currents drawn by run and start windings WS and WR. One leg 5 of this U-shaped strip constitutes a heater unit H1B, while the other leg 7 constitutes a second heater H2B. The outer ends of legs 5 and 7 are connected to windings WS and WR, respectively, as indicated. This integral strip structure 3 includes a yoke section 9 to which the thermostatic element T is welded at junction J. Leg 5 is depressed for a portion of its length to afford space for movement of element T. This depression may be quite shallow, so that the outer portion of element T may physically touch the upper surface of H1B and further increase the heat transfer therebetween during periods when contacts CM and CS are separated. This will advantageously further decrease the cooling rate of element T. It will also be noted that if leg 5 is depressed sufficiently so that there is no such physical contact, element T is nonetheless moved into closer physical proximity to H1B in the former's circuit-open condition, which enhances the heat-exchange relationship therebetween. Because junction J is positioned along yoke 9 closer to leg 5 than to leg 7, the heat-exchange relationship between H1B and T is improved, while that between H2B and T is diminished.

Figure 4:
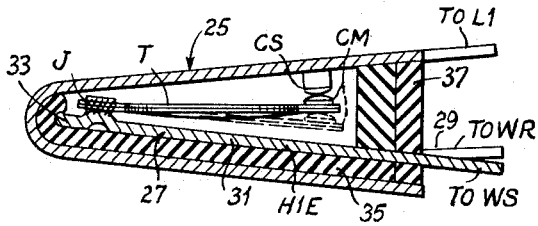
FIG. 4 is a top plan view of another embodiment of overload protective apparatus of this invention.

The overload protective apparatus of FIG. 4 is similar to that of FIGS. 2 and 3 except for the use of an L-shaped strip of electrically resistant metal 11, and a wire helix being used in place of the U-shaped strip 3. The helix, indicated at H1C, also has a permanent heat-conductive connection at junction J and furnishes large amounts of heat very quickly to thermostatic element T during a locked rotor condition and therefore functions in substantially the same fashion as H1, H1A and H1B. The longer leg of member 11, indicated at numeral 13, constitutes a run winding heater unit H2C. The thermostatic element T is welded at junction J at the outer end of the shorter leg 15 of member 11. The operation of this embodiment is the same as that described previously for the other embodiments.

Figure 5:
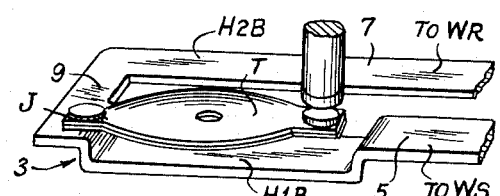
FIGS. 5 and 6 are cross sections respectively of two other overload protective apparatus embodiments of my invention; and, FIG. 7 is a top plan view of internal components of the overload protective apparatus of FIG. 6.

The three-terminal motor protector of FIG. 5 is quite similar to the overload protective apparatus of FIG. 2 in that it includes an electrically resistant metallic strip type heating unit 17 series-connected between the thermally conductive junction J and winding WS. However, the central portion of the strip indicated at H1D is raised instead of depressed as in FIG. 3. In order to provide the vertical spacing between the opposing surfaces of T and H1D, junction J is made by welding T to a dimpled portion 18 of strip 17. Also, thermostatic element T, its movable contact CM and stationary contact CS, as well as strip 17, are mounted in a flanged housing 19 of insulating material, such as a ceramic composition. The housing is provided with a metallic closure 21 having terminal lug 23 to which is connected one side of the A.C. power source L1. Contact CS is secured to the underside of closure 21 by welding or riveting, etc. This latter feature of FIG. 5 has the advantage of providing a means for calibrating the device as to operating and reset temperatures by bending in the cover on closure 21.

Figure 6:
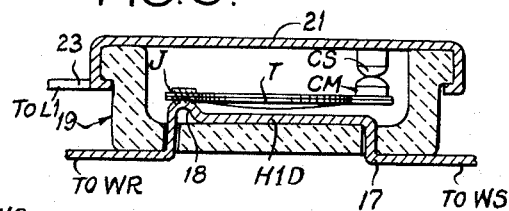
Figure 7:
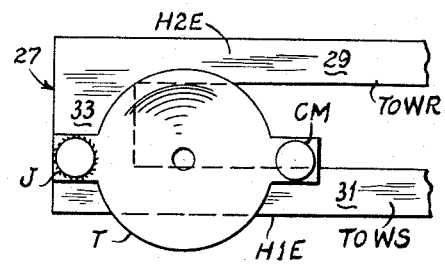

Referring to FIGS. 6 and 7, a still further embodiment of my invention is illustrated. In this exemplary protection apparatus, a metal can 25 encloses a U-shaped electrical resistance strip 27 having a leg 29 constituting a run winding current-responsive heater unit H2E, and another leg 31 constituting a start winding current-responsive heater unit H1E. Junction J, the point of attachment of thermostatic disc T to a yoke portion 33 of strip 27, is offset to one side of the yoke, so as to position disc T in closer thermal transfer relationship to H1E. This junction J is made at a raised or dimpled portion of yoke 33 so as to space the undersurface of element T away from the upper surface of H1E. These components are secured in housing 25 by means of insulating material 35 between the undersurface of strip 27 and the adjacent inner surface of housing 25. As in FIG. 5, stationary contact CS is mounted on the inner surface of housing 25 by welding, etc., so as to be in registry with contact CM. The outer ends of legs 29 and 31 are connected to WR and WS as indicated, and the unit is sealed by the use of an end plug 37 of any conventional potting compound. Again, as in the preceding embodiments, the cooling time of element T is prolonged because of the maintaining of heat transfer by conduction from the start winding heating unit to disc T when the latter is in its "off" condition (as shown in the dashed line position of FIG. 6). Although, as noted above, this overload protective apparatus need not be mounted directly on the motor housing or in the winding, the physical shape and size of the FIGS. 6 and 7 embodiment is such that it is particularly adaptable for such mounting on or quite near the windings of motor Mt.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. In overload protective apparatus for an electrical motor having start and run windings; first and second electrical heaters of thermally conductive electrically resistant material meeting at a junction, an electrically conductive thermostatic element welded at one point to said junction to form an electrical junction of high thermal conductivity, said thermostatic element being cantilevered from said junction and positioned adjacent to and substantially parallel with but spaced from one surface of said first heater, said thermostatic element having a movable contact affixed thereto at a point spaced from said junction, a stationary contact connected to one side of a source of electrical power and normally engaged by said movable contact, said run winding being connected between said second heater and the other side of said power source, said start winding being connected between said other side of said power source and said first heater, said element having a predetermined operating temperature which when exceeded will actuate said element to move said movable contact away from said stationary contact and toward said first heater, whereby heat will continue to be conducted from both of said heaters through said junction to said thermostatic element while said contacts are separated and thereby decrease the cooling rate of said element, and whereby the spacing of the thermostatic element from the first heater is decreased during the period when said contacts are separated, thereby further decreasing the cooling rate of said element.

2. In overload protective apparatus as set forth in claim 1, said thermostatic element being positioned in heat-exchange relationship with said start and run windings.

3. In overload protective apparatus as set forth in claim 1, an insulating housing enclosing said thermostatic element and said heaters, and an electrically and thermally conductive metal cover therefor, said stationary contact being affixed to the inner surface of said cover.

4. In overload protective apparatus for an electrical motor having start and run windings, a U-shaped strip of thermally conductive electrically resistant material having first and second substantially parallel legs and a yoke portion interconnecting said leg portions, an electrically conductive thermostatic element welded at one point to said strip yoke to form an electrical junction of high thermal conductivity, said thermostatic element being cantilevered from said junction and positioned adjacent to and substantially parallel with but spaced from one surface of said first leg, said thermostatic element having a movable contact affixed thereto at a point spaced from said junction, a stationary contact connected to one side of a source of electrical power and normally engaged by said movable contact, said run winding being connected between the outer end of said second leg and the other side of said power source, said start winding being connected between the outer end of said first leg and said other side of said power source, said strip legs being positioned in heat-exchange relationship with said thermostatic element to heat it in response to the currents drawn through said legs by said start and run windings respectively, said element having a predetermined operating temperature which when exceeded will actuate said element to move said movable contact away from said stationary contact and toward said first leg, whereby heat will continue to be conducted from said U-shaped strip through said junction to said thermostatic element while said contacts are separated and thereby decrease the cooling rate of said element.

5. In overload protective apparatus as set forth in claim 4, said thermostatic element being positioned in a better heat-exchange relationship to the first leg than to said second leg.

6. In overload protective apparatus as set forth in claim 4, said thermostatic element being positioned in heat-exchange relationship with said start and run windings.

7. In overload protective apparatus as set forth in claim 4, an insulating housing enclosing said thermostatic element and said strip, and an electrically and thermally conductive metal cover therefor, said stationary contact being affixed to the inner surface of said cover.

8. In overload protective apparatus as set forth in claim 6, a metal housing enclosing said thermostatic element and said strip, said stationary contact being affixed to the inner surface of said housing, and insulation between at least one surface of said second leg and the inner surface of said housing.

References Cited in the file of this patent
UNITED STATES PATENTS

| | | |
|---|---|---|
| 1,997,673 | Boothby | Apr. 16, 1935 |
| 2,117,123 | Werner | Mar. 10, 1938 |
| 2,304,018 | Raney | Dec. 1, 1942 |
| 2,338,515 | Johns | Jan. 4, 1944 |

UNITED STATES PATENT OFFICE
CERTIFICATION OF CORRECTION

Patent No. 3,004,203                      October 10, 1961

Henry David Epstein

It is hereby certified that error appears in the above numbered patent requiring correction and that the said Letters Patent should read as corrected below.

Column 2, line 17, beginning with "winding WS" strike out all to and including "electrically con-" in line 20, same column, and insert instead -- winding WS. One side of each of these windings is commonly connected through a line switch SW2 to a terminal L2 of an A.C. power source. The other side of the start winding WS (via SW1) and WR are electrically con- --; column 3, line 15, for "switches" read -- switch --; line 38, after "resistant" insert a comma.

Signed and sealed this 3rd day of April 1962.

(SEAL)
Attest:
ERNEST W. SWIDER
Attesting Officer

DAVID L. LADD
Commissioner of Patents